United States Patent [19]
Gill

[11] Patent Number: 5,652,396
[45] Date of Patent: Jul. 29, 1997

[54] FLUID FLOWMETER

[75] Inventor: Michael John Gill, Lymore Valley Milford-on-Sea, Great Britain

[73] Assignee: British Gas plc, London, Great Britain

[21] Appl. No.: 464,857

[22] PCT Filed: Mar. 16, 1994

[86] PCT No.: PCT/GB94/00526

§ 371 Date: Jul. 10, 1995

§ 102(e) Date: Jul. 10, 1995

[87] PCT Pub. No.: WO94/21989

PCT Pub. Date: Sep. 29, 1994

[30] Foreign Application Priority Data

Mar. 16, 1993 [GB] United Kingdom ............ 9305362

[51] Int. Cl.$^6$ ............................................. G01F 1/00
[52] U.S. Cl. ............................................. 73/861.27
[58] Field of Search ............................ 73/861.27, 861.28, 73/861.31

[56] References Cited

U.S. PATENT DOCUMENTS

| 5,093,810 | 3/1992 | Gill | 367/1 |
| 5,163,331 | 11/1992 | Gill | 73/861.28 |
| 5,168,762 | 12/1992 | Gill | 73/861.28 |
| 5,178,018 | 1/1993 | Gill | 73/861.28 |
| 5,243,863 | 9/1993 | Gill | 73/861.28 |
| 5,375,099 | 12/1994 | Gill | 367/140 |
| 5,383,369 | 1/1995 | Khuri-Yakub et al. | 73/861.29 |
| 5,461,931 | 10/1995 | Gill | 73/861.28 |

OTHER PUBLICATIONS

International Search Report, International Application No. PCT/GB94/00526, Eurpoean Patent Office Jun. 3, 1994.

Primary Examiner—George M. Dombroske
Assistant Examiner—Ronald Biegel
Attorney, Agent, or Firm—Oblon, Spivak, McClelland, Maier & Neustadt, P.C.

[57] ABSTRACT

A fluid flowmeter includes a conduit through which fluid flows by way of an inlet and an outlet for flow rate measurement. A first transducer transmits signals to and receives signals from a second transducer by way of the conduit. A second transducer is spaced from the first transducer along the conduit and transmits signals to and receives signals from the first transducer. A detector detects the time of flight of the signals between the transducers in order to measure the flow rate of the fluid along the conduct. A rod extends along the conduit to provide an annular flow path along which the signals are transmitted.

7 Claims, 2 Drawing Sheets

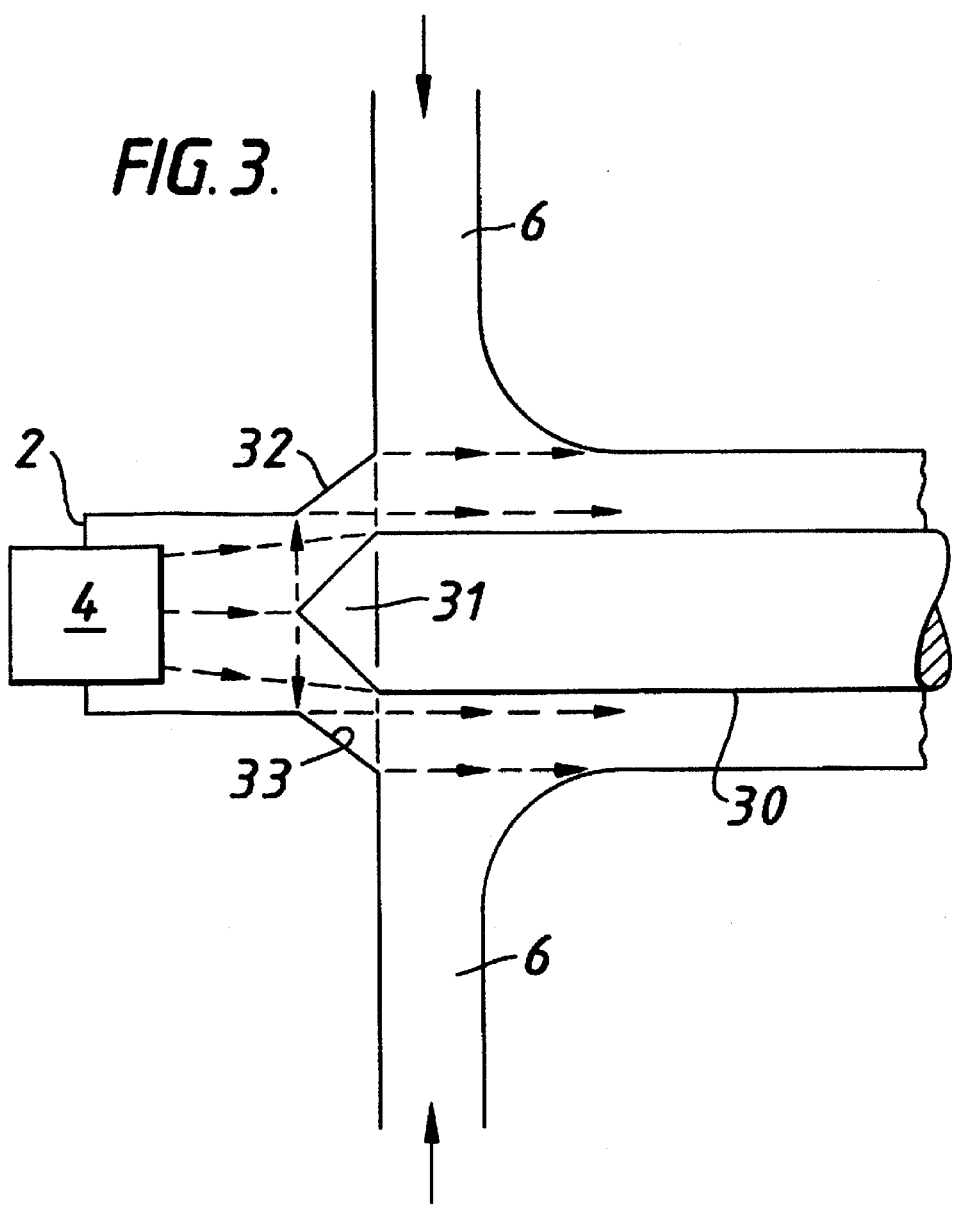
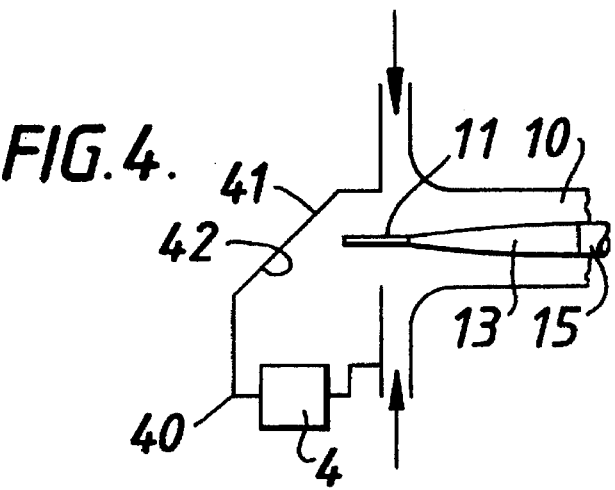

FLUID FLOWMETER

BACKGROUND OF THE INVENTION

1. Field of the Invention

The present invention relates to a fluid flowmeter particularly although not exclusively of the ultrasonic axial flow type.

2. Discussion of the Background

Fluid flowmeters of the axial ultrasonic type comprise a conduit through which, in use, a fluid flows by way of inlet means and outlet means for flow rate measurement, a first transducer for transmitting signals to and receiving signals from a second transducer by way of the conduit, the second transducer being spaced from the first transducer along the conduit for transmitting signals to and receiving signals from the first transducer and means for detecting the time of flight of the signals between the transducers in order to measure the flow rate of fluid along the conduit.

A problem with fluid flowmeters of the above type is that there is a tendency for spurious signal reflections to occur at the walls of the conduit. These interfere with the actual signal or at least provide false or inaccurate time of flight readings and therefore false or inaccurate fluid flow rate measurements.

It is therefore an object of the present invention to alleviate these effects.

SUMMARY OF THE INVENTION

According to the present invention there is provided a fluid flowmeter comprising a conduit through which in use fluid flows by way of inlet means and outlet means for flow rate measurement, a first transducer for transmitting signals to and receiving signals from a second transducer by way of the conduit, the second transducer being spaced from the first transducer along the conduit for transmitting signals to and receiving signals from the first transducer, means for detecting the time of flight of the signals between the transducers in order to measure the flow rate of the fluid along the conduit and means extending along the conduit to provide for the fluid an annular flow path along which in use the signals are transmitted.

Preferably the means extending along the conduit comprises a rod which suitably tapers outwardly from its ends to form a section of maximum external diameter within the conduit.

Conveniently the rod comprises a number of interconnected sections of differing external diameters.

In one embodiment the ends of the rod are conical but in this case the rod is otherwise of constant external diameter.

BRIEF DESCRIPTION OF THE DRAWINGS

Embodiments of the invention will now be particularly described with reference to the drawings in which:

FIG. 3 is a schematic side view of one end of a third embodiment of the invention, and FIG. 4 is a side view of one end of an alternative arrangement for FIG. 1.

DESCRIPTION OF THE PREFERRED EMBODIMENTS

Figure 1:
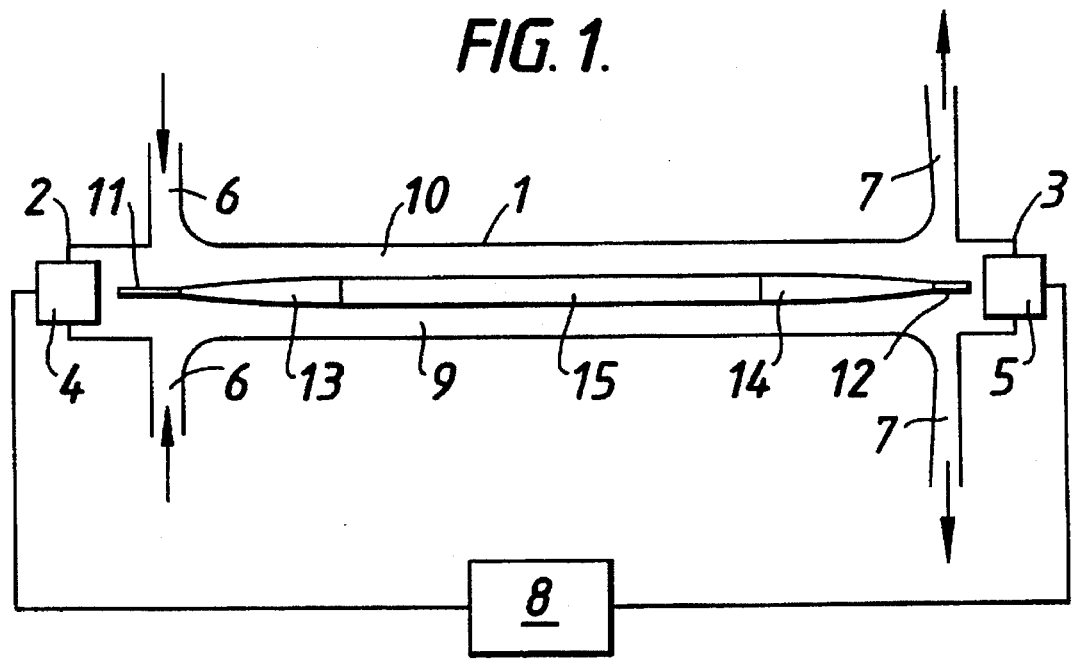
FIG. 1 is a schematic side view of a first embodiment of the invention.

Referring to FIG. 1 the fluid flowmeter illustrated is of the ultrasonic axial flow type and includes a straight or linear conduit 1, having first and second ends 2 and 3 in which are respectively mounted first and second transducers 4 and 5. The transducers 4 and 5 are positioned to transmit ultrasonic signals along the conduit 1 towards the other transducer and to receive such signals after transmission. The conduit I is formed with fluid inlet means 6 which in this case takes the form of two diametrically opposed inlet tubes adjacent the first end 2 of the conduit 1. Similarly the conduit 1 is formed with fluid outlet means 7 which also take the form of two diametrically opposed outlet tubes. The transducers 4 and 5 are each connected to a detector 8 for detecting the time of flight of each signal through the fluid flowing in the conduit. The detector 8 incorporates an electronic processing apparatus whereby the time of flight of a signal in one direction can be used with the time of flight of a signal in the opposite direction to compute the flow rate of the fluid along the conduit. The detector 8 may also include an indicator (not shown) in the form of a visual display showing a volume flow rate or total volume flow over a given period. Thus far the fluid flowmeter described is well known in the art and detailed description of the components and operation of the device is unnecessary.

However, the fluid flowmeter described also includes means in the form of a rod 9 which extends along the conduit 1 and provides for the fluid an annular flow path 10 along which, in use, the signals from the transducers 4 and 5 are transmitted.

The rod 9, which is solid, tapers outwardly from its ends 11 and 12 via tapering sections 13 and 14 to a central section 15 of maximum constant external diameter. At this point of course the radius of the annular flow path 10 is at a minimum. The ends 11 and 12 of the rod 9 are mounted by means (not shown) to the internal wall of the conduit 1.

Figure 2:
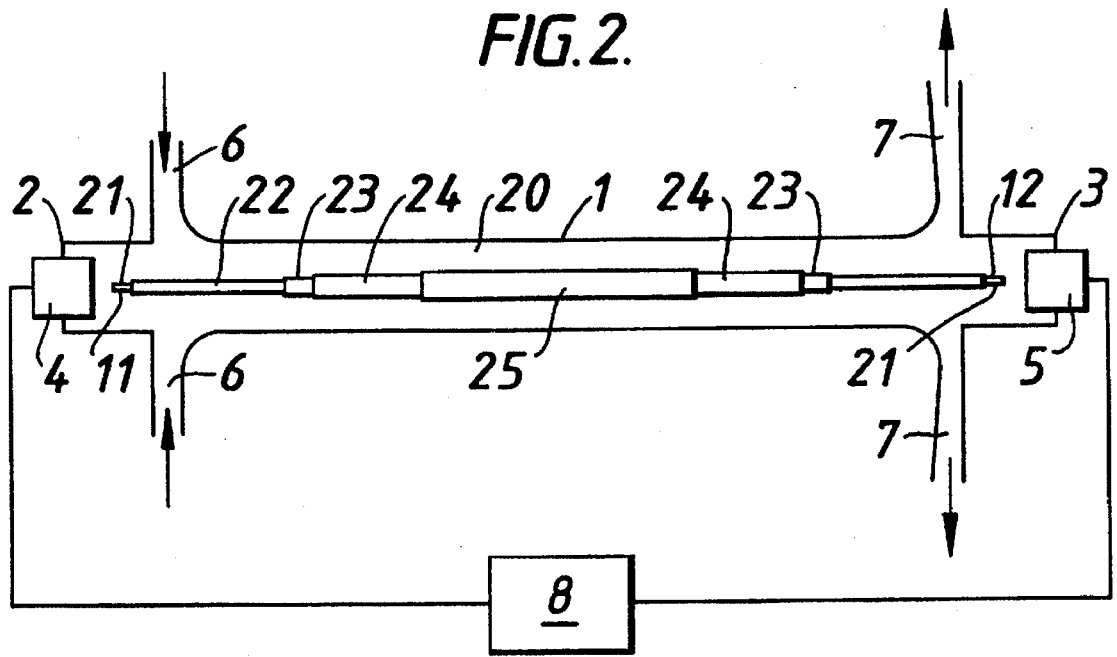
FIG. 2 is a schematic side view of a second embodiment of the invention.

FIG. 2 is similar to FIG. 1 and similar components bear identical references to the components in FIG. 1. The only difference in FIG. 2 is the construction of the rod 20. This comprises a number of sections 21 to 25 of differing external diameters. The longest section 21 is solid, also has the smallest external diameter and forms the axial centrepiece of the rod 20 and it also forms ends 11 and 12 of the rod 20. The remaining sections 22 to 25 are tubular in form and they each sleeve the adjacent section of smaller external diameter, the section of smaller external diameter being longer than the adjacent section of larger external diameter. Here again the central rod section 25 is of maximum constant diameter and the section 25 forms with the internal wall of the conduit a minimum annular flow path radius.

As with FIG. 1 the ends 11 and 12 of the rod are mounted by means (not shown) to the internal wall of the conduit 1.

FIG. 3 is also similar to FIGS. 1 and 2 and similar components bear identical reference numerals to those in those figures. Here the rod 30 is of constant diameter but each end 31 (only the left hand shown) is of conical form. The conduit 1 has frusto-conical wall portion 32 connecting it to the inlet means 6 (and to the outlet means 7 at the other end of the conduit 1). The conical ends 31 of the rod 30 and the inner wall 33 of the wall portion 32 is mirrored to reflect the beams from the transducers in the manner shown by the arrows in the Figure, i.e. the beam is converted from a generally cylindrical initial form as it leaves the transducers into an annular form by reflection firstly from the ends 31 of the rod 30 and then from the wall portions 32.

Referring to FIG. 4 which is similar to FIG. 1 and bears similar reference numerals, here the end 40 of the conduit 1 is offset from the axis of the rod 9 and the transducer 4 is mounted at this end. A wall portion 41 of the conduit 1 is angled in such a manner so that signals from the transducer 4 are reflected from the internal wall 42 of the portion 41 along the annular flow path 10 to be received by reflection by the other transducer 5, the internal wall 41 being mirrored for this purpose. The conduit 1 is similarly designed at the other end and the other transducer 5 is similarly mounted to transmit by reflection signals to transducer 4 which receives them by reflection from the wall 41.

The transducer reflection arrangement described with reference to. FIG. 4 can be incorporated into the arrangement shown in FIG. 2 as well in place of the direct axial transmission and reception transducer arrangement shown.

The flowmeter shown in the figures can be used to meter gas flow in a gas meter. In this case the flowmeter would be mounted inside a box which would display externally the total quantity of gas consumed by the consumer since installation of the meter. We have found that the annular flow passage formed inside the conduit by the rod appears to render fluid flow more uniform within the conduit. This leads to a reduction in the propagation of spurious signal reflections and therefore to more accurate fluid flow rate measurements.

The rod supports should ideally be mounted between the inlet and its transducer and between the outlet and its transducer, i.e. out of the general flow path of the fluid so as to avoid, in the case particularly where the fluid is gas, a build up on the supports of debris or lint carried by the gas. Such build up, if allowed to occur, may eventually block the flow path.

I claim:

1. A fluid flowmeter comprising:

a conduit through which fluid flows by way of inlet means and outlet means for flow rate measurement;

a first transducer for transmitting signals to and receiving signals from a second transducer by way of the conduit, the second transducer being spaced from the first transducer along the conduit for transmitting signals and receiving signals from the first transducer;

means for detecting a time of flight of the signals between the first and second transducers in order to measure a flow rate of the fluid along the conduit; and a rod extending along the conduit to provide for the fluid an annular flow path along which the signals are transmitted, the rod comprising a number of sections of differing diameters and including at least one elongate section of constant diameter.

2. A fluid flowmeter as claimed in claim 1, including a plurality of elongate sections each of a constant diameter.

3. A fluid flowmeter as claimed in claim 1, wherein the diameter of the rod tapers outwardly from its ends to form a section of maximum diameter within the conduit.

4. A fluid flowmeter as claimed in claim 3, wherein the rod comprises a number of interconnected sections of differing diameters.

5. A fluid flowmeter as claimed in claim 1, wherein the rod comprises ends which are conical, the rod being otherwise of constant diameter.

6. A fluid flowmeter as claimed in claim 5 wherein otherwise the rod is of constant external diameter.

7. A fluid flowmeter comprising:

a conduit through which fluid flows by way of inlet means and outlet means for flow rate measurement;

a first transducer for transmitting signals to and receiving signals from a second transducer by way of the conduit, the second transducer being spaced from the first transducer along the conduit for transmitting signals and receiving signals from the first transducer;

means for detecting a time of flight of the signals between the first and second transducers in order to measure a flow rate of the fluid along the conduit; and means extending along the conduit to provide for the fluid an annular flow path along which the signals are transmitted, wherein the rod comprises ends which are conical, with a remaining portion of the rod being of constant diameter.

* * * * *